Figure 1:
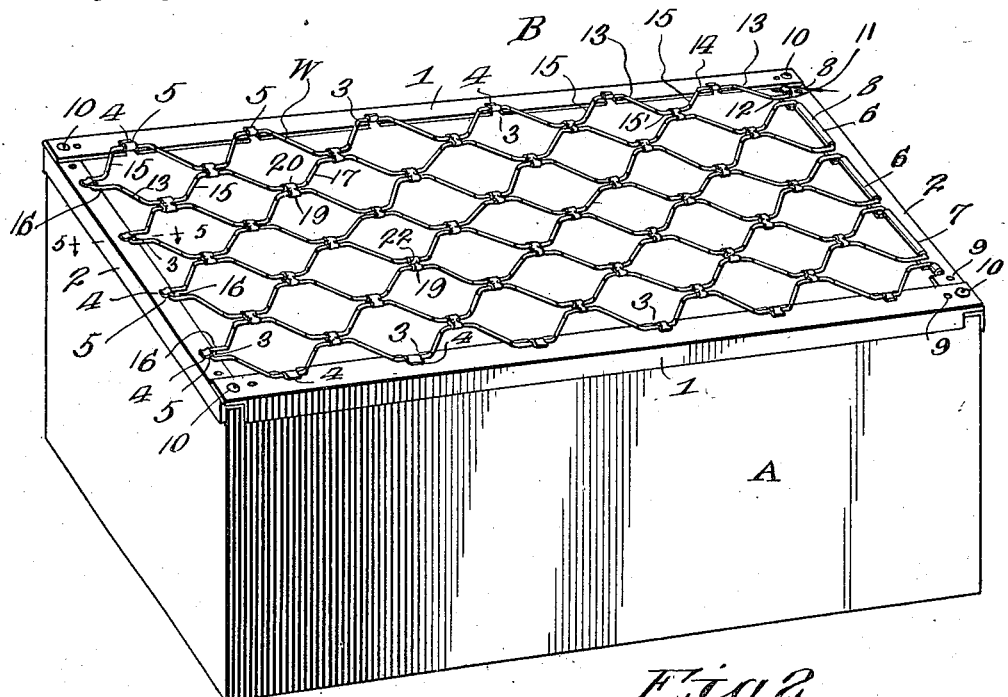

E. L. CANON.
PEANUT PICKER.
APPLICATION FILED FEB. 6, 1915.

1,153,598.

Patented Sept. 14, 1915.
2 SHEETS—SHEET 1.

Witnesses
Thos. E. Johnson
eu R [illegible]

Edward L. Canon Inventor

E. L. CANON.
PEANUT PICKER.
APPLICATION FILED FEB. 6, 1915.
1,153,598.
Patented Sept. 14, 1915.
2 SHEETS—SHEET 2.
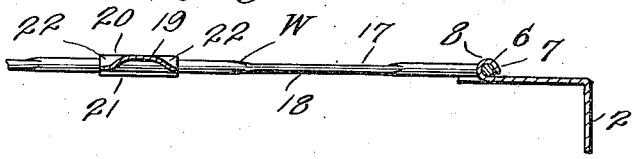
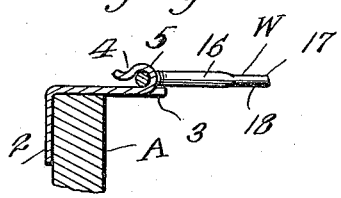
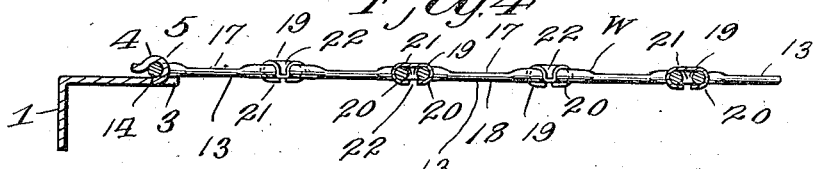
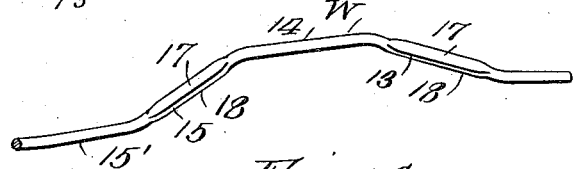
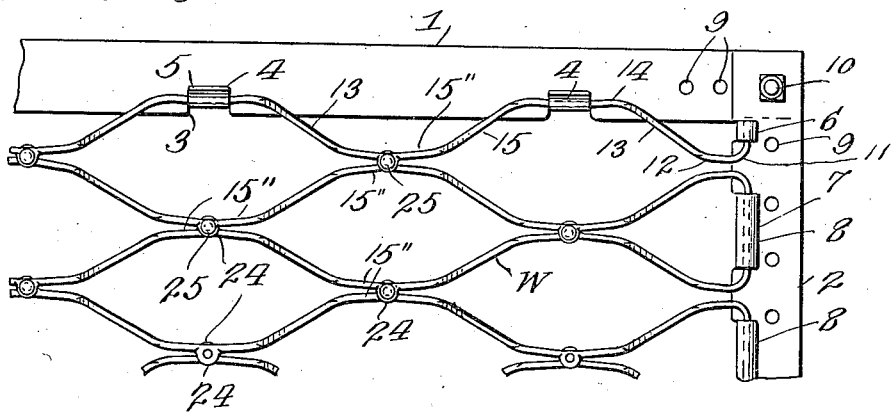
Witnesses
Thos. E. Johnson
W R Wright
Edward L. Canon   Inventor

UNITED STATES PATENT OFFICE.

EDWARD L. CANON, OF QUITMAN, GEORGIA.

PEANUT-PICKER.

1,153,598.  Specification of Letters Patent.  Patented Sept. 14, 1915.

Application filed February 6, 1915. Serial No. 6,503.

*To all whom it may concern:*

Be it known that I, EDWARD L. CANON, a citizen of the United States, residing at Quitman, in the county of Brooks and State of Georgia, have invented certain new and useful Improvements in Peanut-Pickers, of which the following is a specification.

This invention relates to a manually operable device for removing peanuts or pinders from their vines, and has for its primary object to provide a device of this character by which the nuts are effectually disengaged from their attaching stem upon the vines without cracking or damaging the shells of said nuts.

A further object of the invention is to provide a device of the character described in which each peanut or pinder has its vine attaching stem independently and separately guided into engagement with a stem snapping cleat upon the device in such a manner as to snap or break said stems at their juncture with the shells of the nuts.

A further object of the invention is to provide an article of manufacture of the class described in which the stem snapping or breaking means are adjustable upon and with a reticulated covering in such a manner as to regulate the relative distance between each pair of stem guiding shoulders upon said covering and the stem breaking means to render the invention applicable to harvesting crops where the size of the fruit varies to a marked degree.

A still further object of the invention is to provide means which not only maintains the reticulated covering in an extended position, but also enables the attachment of said covering to a box or bag to be accomplished in a satisfactory manner, and to further provide means by the use of which access may be gained to the said receptacle or to a portion of the above mentioned covering when repairs thereto are necessary while the invention is in operation.

A further object of the invention is to provide a device of the character described which is simple in construction, inexpensive of manufacture and highly efficient in use.

The invention consists in the improved construction and novel arrangement and combination of parts which will be hereinafter fully described and particularly pointed out in the claims.

The preferred embodiment of the invention has been illustrated in the accompanying drawings, but no restriction is necessarily made to the precise details of construction therein shown, as changes, alterations and modifications within the scope of the claims may be resorted to when desired.

Figure 2:
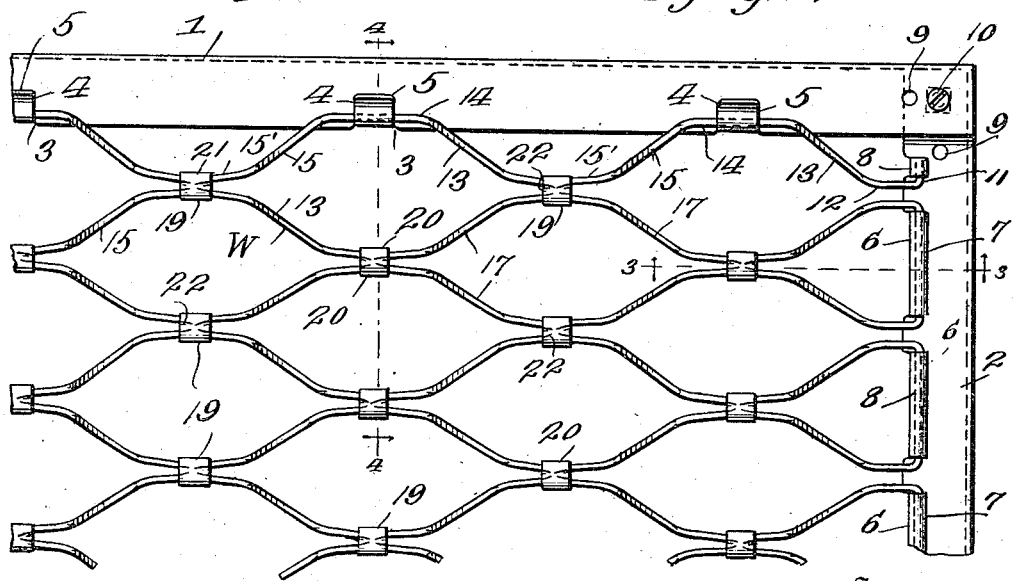

In the drawings, Figure 1 is a perspective view showing the invention applied to a box. Fig. 2 is a fragmentary top plan view of a portion of the reticulated covering and the frame associated therewith. Fig. 3 is a section on the line 3—3 of Fig. 2, looking in the direction indicated by the arrows. Fig. 4 is a transverse section on the line 4—4 of Fig. 2, looking in the direction indicated by the arrows. Fig. 5 is a section on the line 5—5 of Fig. 1 taken through one of the frame members and a portion of the reticulated covering associated therewith. Fig. 6 is a fragmentary perspective view of a portion of the wire which forms the reticulated covering. Fig. 7 is a top plan view of a portion of the reticulated covering and the frame associated therewith, showing a modified form of the invention.

Like characters of reference denote corresponding parts throughout the several views.

The letter A designates a box or receptacle, and B, the improved peanut or pinder picker applied thereto.

The picker proper comprises a frame composed of side members 1 and end members 2. Both of said members 1 and one of the end members 2 are cut or slit, as at 3, and formed integral with said members between the slits or cuts are tongues 4, said tongues being adapted to be bent backward or rolled, as at 5, over the body portion of the said side and end members. One of the end members 2 is slitted similarly to the side members 1, and has the tongue 6 thereon rolled backward upon the body portion of said member, as at 7, to provide sleeves 8. The side members 1 and the end members 2 are adjustable through openings 9 in said members and bolts 10 engageable therewith.

A single strand of wire W has its end bent, as at 11, to engage one of the outermost sleeves 8 upon the end member 2, and has its body portion thence drawn rearwardly in a plane parallel to the side members 1, for a portion of its length, as at 12; thence bent upwardly and outwardly, as at 13; thence parallel, as at 14, with the side member 1 and under the tongue 3 thereon for a portion of its length; thence downwardly and inwardly, as at 15; thence parallel, as at 15', with the side member 1, and again bent upwardly and outwardly, as at 13. This bending operation is continued with each of the parallel portions 14 of said wire W passing under the tongues 3 until the opposite end member 2 is reached, where a loop 16 is formed in said strand of wire to engage the tongue 3 upon the said end member. After bending the strand of wire W to form the loop 16, the said wire is bent conversely to the manner above described until a sleeve 8 upon the end member 2 is reached, whereupon after passing the wire W through said sleeve, it is again bent in the manner as first described, and so on, alternating in the manner of bending the wire W until the space within the frame A is completely overspread by a reticulated top or cover.

The slanting portions 13 and 15 of the wire W are flattened upon their top sides, as at 17, and slightly flattened upon their undersides, as at 18, to form nut guiding shoulders while the opposing parallel portions 15' of said wires are joined together intermediate their lengths by a cleat or snapping member 19 to form stem guiding passages.

The snapping member 19 has its ends rolled, as at 20, to form eyes 21 with which the portions 15' of the wire W engage. The portion 21 intermediate of the rolled ends 20 of the stem snapping member or cleat 19 is recessed or depressed upon opposite sides, as at 22, between the alined portions 15' of the wire W to coöperate with the portions 15' in snapping the stem at the juncture thereof with the shell of the peanut or pinder in a manner presently described. It will be seen that when the cleat 19 is attached to the portions 15' of the wire W, the said portions are caused to converge from the flattened portions 15 and 13 toward the recesses or depressions 22 in the said cleat, thereby preventing longitudinal movement of the cleat, and the said depressions will limit the degree to which the portions 15' may be converged. Furthermore, the converging portions 15' coöperate with the flattened portions 13 and 15 of the wire W to form stem and nut guiding shoulders by means of which the attaching stem of each peanut is individually guided into engagement with a recess in the snapping cleat 19.

In the modified form of the invention disclosed in Fig. 7 the construction is identical with that above described, with the exception that the converging portions 15' are provided with flattened eyes 24 through which is passed a rivet 25.

In the operation of the device it will be apparent that the frame A is placed upon a box or engaged with a bag, and the vines from which the peanuts are to be removed are manually drawn across the reticulated covering upon the frame. The peanuts fall between the interstices between the cleats 19 and are guided by the shoulders upon the wire W between the converging stem guiding portions 15' into engagement with recesses in the cleats 19, whereupon they are snapped from the vines and fall within the receptacle.

It is easily seen that the flattened portions 13 and 15 upon the wire W enable the peanuts to be drawn beneath the converging portions 15' and the stem thereon engaged within the recesses 22 of the cleat 19, whereupon the said stem is snapped from the peanut at its juncture with the shell. By squeezing the eyes 20 together the converging portions 15' may be made to converge toward the depressions 22 to a greater or less degree, thereby rendering the device applicable to the harvesting of crops where the fruit varies in size to a marked degree, or, as in Fig. 7, the same adjustment can be made by adjusting either the side or end members.

When it is desired to attach the invention to a sack or bag the edge of the sack may be wrapped over a plurality of the portions 14, and the said portions 14 and sack engaged beneath the tongues 3, or if it is desired to repair any portion of the reticulated covering without removing the device from a sack or bag any one or all of the portions 14 or 16 may be disengaged from the tongues 3, and the cover swung to an upright position by means of a hinge joint upon the member 2.

Having thus described the invention, what is claimed as new, is:—

1. In a peanut picker, a wire fabric having meshes therein, cleats engaged with the wires surrounding the meshes adapted to form stem guiding passages in advance of the cleats, and stem snapping means formed integral with the cleats adapted to close the ends of said passages.

2. In a peanut picker, a wire fabric having meshes therein, cleats engaged with the wires surrounding the meshes to provide stem guiding passages at opposite ends of the cleats, and stem snapping means upon the cleats disposed within said passages.

3. In a peanut picker, a wire fabric having meshes therein, flattened portions upon the wires surrounding the meshes adapted to form nut guiding shoulders, cleats engaged with said wires and provided with depressions disposed therebetween, said cleats and flattened portions coöperating to provide stem guiding passages in advance of the depressions in the cleats, whereby the depressions in the cleats are enabled to snap the stems at their juncture with the shells of the nuts.

4. In a peanut picker, a wire fabric having stem guiding passages, cleats engaged with the wires surrounding said passages, and depressed portions upon said cleats interposed between said wires and coöperating with the cleats to cause the above mentioned wires to converge at opposite ends of the cleats and prevent the longitudinal movement of the latter.

In testimony whereof I affix my signature in presence of two witnesses.

EDWARD L. CANON.

Witnesses:
 THOS. E. JOHNSON,
 W. R. KNIGHT.

Copies of this patent may be obtained for five cents each, by addressing the "Commissioner of Patents, Washington, D. C."